Sept. 1, 1931.                W. H. DAY                1,821,293
                            INDEX OR FILE
                    Filed July 27, 1925    3 Sheets-Sheet 1
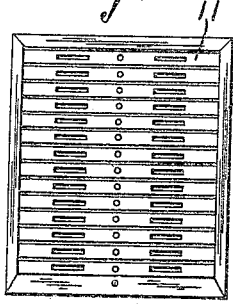
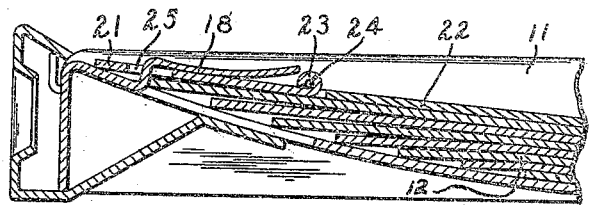
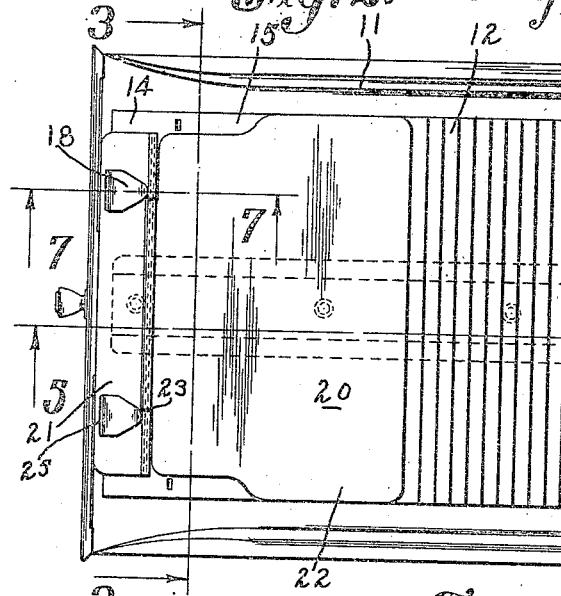
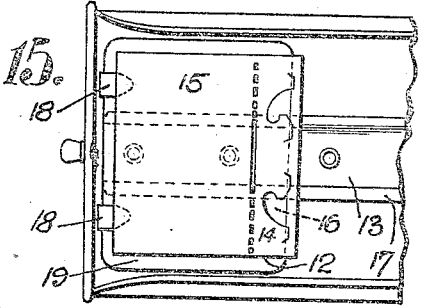
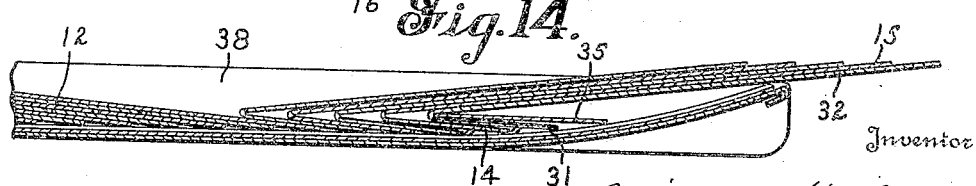
Inventor
William H. Day
By Henry E. Rockwell
                Attorney

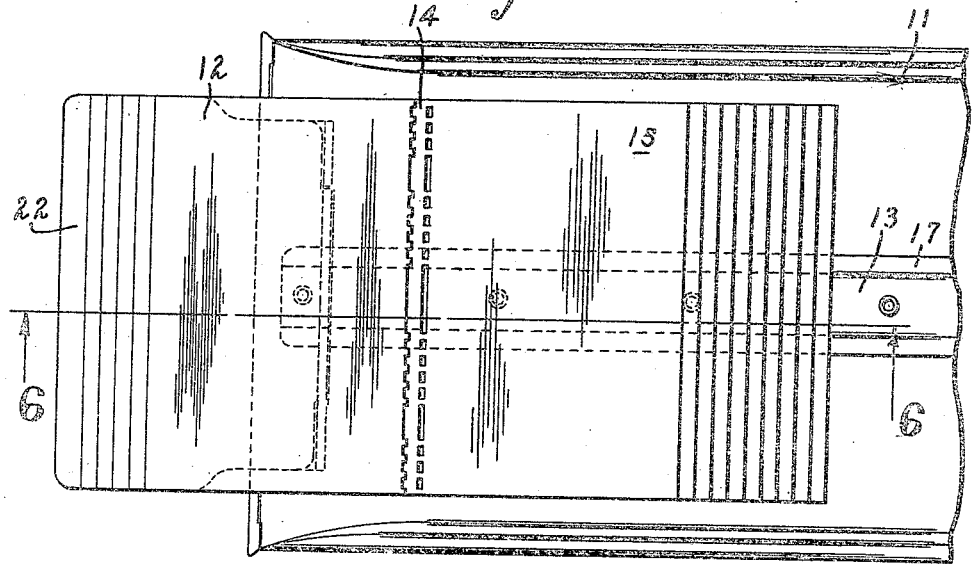
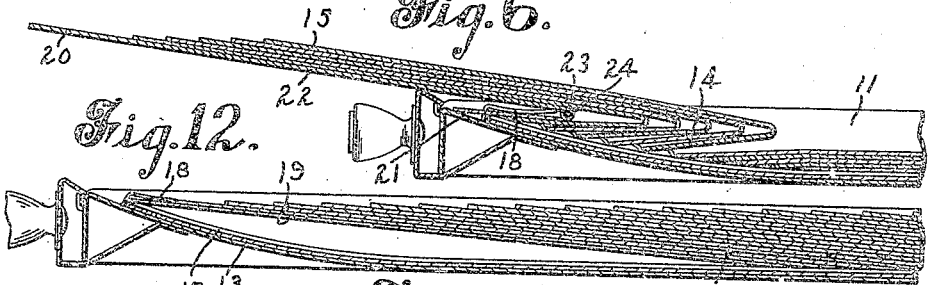
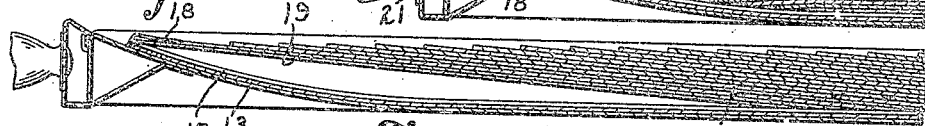
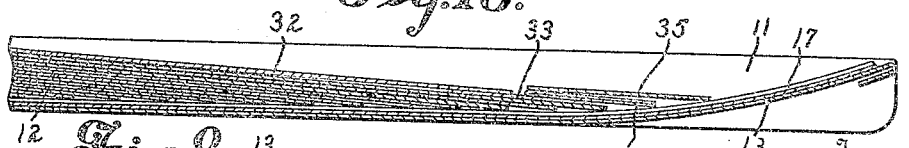
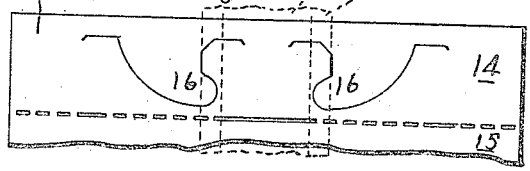

Sept. 1, 1931.  W. H. DAY  1,821,293
INDEX OR FILE
Filed July 27, 1925  3 Sheets-Sheet 3

Inventor
William H. Day
By Henry E. Rockwell
Attorney

Patented Sept. 1, 1931

1,821,293

UNITED STATES PATENT OFFICE

WILLIAM H. DAY, OF EAST HAVEN, CONNECTICUT, ASSIGNOR, BY MESNE ASSIGNMENTS, TO REMINGTON RAND INC., OF NEW YORK, N. Y., A CORPORATION OF DELAWARE

INDEX OR FILE

Application filed July 27, 1925. Serial No. 46,335.

This invention relates to filing and index equipment in which card-like index elements are arranged flatwise upon a carrying member in overlapped relation with a margin of each element exposed to view, and more particularly to an improved index element supporting device for use with element-carrying members of such equipment.

The improved device of this invention is preferably for use with the type of index equipment wherein shallow drawers or panels, slidable into and out of a storage receptacle such as a cabinet or the like, constitute the carrying member for the index elements. These carrying members are usually provided with index element guides or retaining means whereby the index elements or cards are allowed to slide lengthwise of the carrying member singly and in groups.

The index elements in many instances are of the hinged type wherein the element is composed of a base portion adapted to engage the guides or retaining means, and a flap portion which is hinged to the base portion. The base portion is usually provided with means cooperating with an adjacent element whereby each of the elements in a series thereof causes the free margin of the flap portion to be extended beyond the element next above or overlapping the same, so as to expose the margin to view. Such hinged cards or index elements when arranged in a supporting frame are, therefore, capable of being swung upwardly from a flatwise position to expose the entire surface of the flap portion of any one of the index elements, and due to the structure of the hinged joint, are also adapted to be swung or bent back substantially 180 degrees. When swung backwardly to such degree the elements at the end of the carrying member are, in many instances, without a support beneath the same, being in such a position that the flap portion extends beyond the end of the carrying member. This is a disadvantage in that the index elements, which often are made of relatively thin material, become distorted, creased, or otherwise mutilated. Under some circumstances, the reverse side of the flap portion is used upon which to record data, and as this data is usually added while the elements are retained in the carrying member, the lack of a support for the end elements causes considerable inconvenience.

One object of this invention, therefore, is to provide a drawer or panel structure adapted to receive and removably retain a plurality of index elements of the above or similar type and also adapted to receive an improved form of supporting device at either end thereof whereby the disadvantages above noted will be obviated.

Still another object of this invention is to provide an improved supporting device for use with such an index or file and which is adapted to be detachably secured to an index element carrying member used for the above purposes, and of the above type, and which is also adapted to be adjustable relatively to the carrying member into proper location to engage and support the contained index elements in an efficient and useful manner.

These and other objects which will hereinafter appear are obtained by this invention which consists of the novel features and combinations of parts to be hereinafter described and claimed.

In the accompanying drawings:

Fig. 1 is a front view of an index or file cabinet having a plurality of drawers or slides therein, embodying the features of this invention;

Fig. 2 is a plan view of the front portion of one of the drawers adapted to be removably retained within the cabinet, and having a plurality of card-like index elements mounted therein and provided with features embodied in this invention;

Fig. 3 is a section on line 3—3 of Fig. 2;

Fig. 4 is a plan view similar to Fig. 2, with the parts thereof in a different operative position;

Fig. 5 is a longitudinal section through the front end portion of the drawer on line 5—5 of Fig. 2;

Fig. 6 is a section on line 6—6 of Fig. 4;

Fig. 7 is an enlarged section on line 7—7 of Fig. 2;

Fig. 8 is a detailed view of one type of card-like index element adapted for use with the features of this invention;

Fig. 12 is a section on line 12—12 of Fig. 9;

Fig. 13 is a section on line 13—13 of Fig. 9, and

Fig. 14 is a section on line 14—14 of Fig. 10.

Fig. 15 is a fragmentary plan view similar to Fig. 9 showing the engagement of the spacer with the first card of the series.

Figure 9:
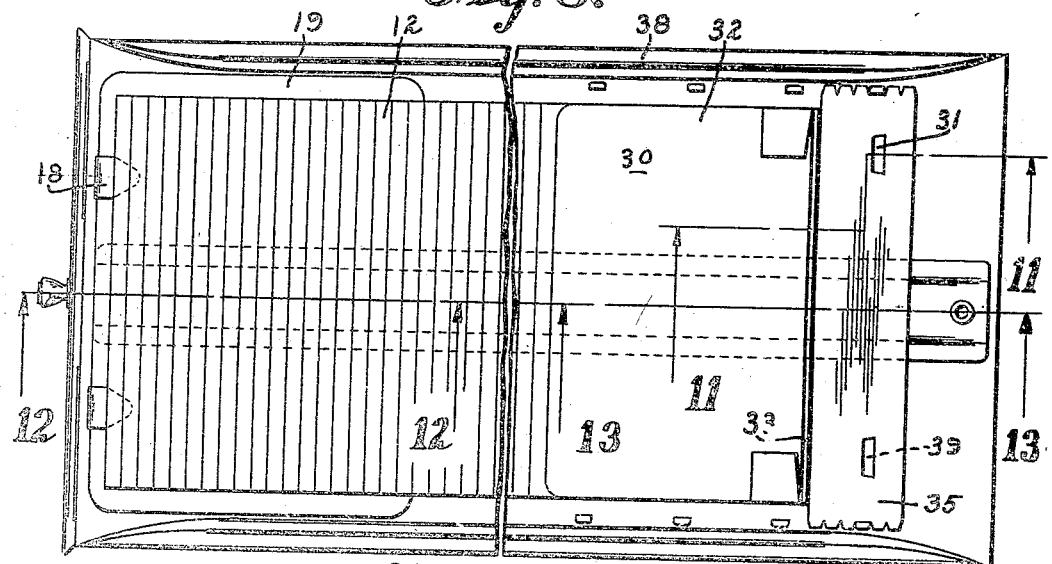
Fig. 9 is a plan view of a drawer similar to that shown in Fig. 2, but wherein the features of this invention are arranged in a somewhat different manner.

For the purpose of illustrating my invention, I have selected one form of index equipment comprising a cabinet 10, which is adapted to receive a plurality of shallow drawers or panels 11. The drawers 11, in this instance, are adapted to detachably retain a plurality of index elements in the form of card-like members 12, by means of a guide strip 13. The members 12 are of the hinged type, having a base portion 14 and a flap portion 15. The base portion 14 is provided with struck-out tongues 16 which not only cooperate with the flanged edges 17 of the guide strip 13 by engagement therewith, but also are adapted to engage an adjacent index element in such a manner that each of the flap portions of the members 12 of the series of index elements will have the free margin thereof exposed to view. The patent to Irving Fisher No. 1,048,056 dated December 24, 1912, described the above cooperation and the feature causing the overlap in detail and further description of this particular type of index card is, therefore, not considered necessary, as reference may be had to said patent. Other forms of index elements are in use which by various structures obtain the same results, and therefore, this invention is not intended to be limited to the particular form of index element shown and described above, except as to the features thereof specifically recited in the combinations claimed hereinafter.

The drawer or panel 11 is provided at its front end with a rearwardly projecting tongue or pair of tongues or ears 18, which is so located relative to the front of the panel that a maximum number of index elements may be contained therein. The ears 18 engage the base portion 14 of the end one of the elements and act as a support for the same when the panel is held in a vertical position, or act as a stop for the same to prevent the elements slipping out of engagement with the guide member or strip 13. A direct engagement of the ears 18 with the base portion 14 of the end element of the series is obtained when the elements are arranged in the panel, as shown in Figs. 2 to 7, inclusive, and an indirect engagement for the same purpose is obtained when the elements are arranged as shown in Figs. 9 to 14, inclusive. In Figs. 9 to 15, inclusive, the ears 18 engage one edge of a flat sheet-like spacer 19, the other edge of which engages the base portion 14 of the end element through the medium of the tongues 16 thereof, in a similar manner as the elements engage one another.

When the cards are arranged as in Figs. 2 to 7, the ears 18 in addition to the use above described also serve as an engaging means to detachably engage and retain a card-supporting device 20. The supporting device 20 comprises an ear-engaging base portion 21 and a flap portion 22. The two portions 21 and 22 are hinged together at 23. They are preferably made of sheet-metal, parts of one of the edges of each portion being folded over a hinge pintle 24 to form the hinge joint 23 in a suitable manner. The base portion 21 of this device is provided with openings 25 properly positioned so that the ears 18 may extend therethrough, as shown in Figs. 2 and 7. The ears 18 being preferably more or less resilient detachably engage the base portion 21 at these points and retain the same securely in position. Due to the resiliency of the ears, the base portion 21 is urged downwardly against the underlying element bases, causing the same to lie flatwise upon the panel.

The hinge structure 23 allows the flap portion 22 of the supporting device to be swung into the position shown in Figs. 4 and 6, and when in that position provides a convenient and efficient support for the flap portions 15 of the index elements 12 when they are likewise swung into the position shown in Figs. 4 and 6. When not in use as a supporting means, the flap portion 22 by resting upon the uppermost card or element assists the retaining means or guide strip 13 to retain the elements flatwise within the drawer panel and prevents them from bowing upwardly beyond the sides of the drawer, thus preventing the liability of their being mutilated by catching upon partitions or the like, located thereabove.

Figure 10:
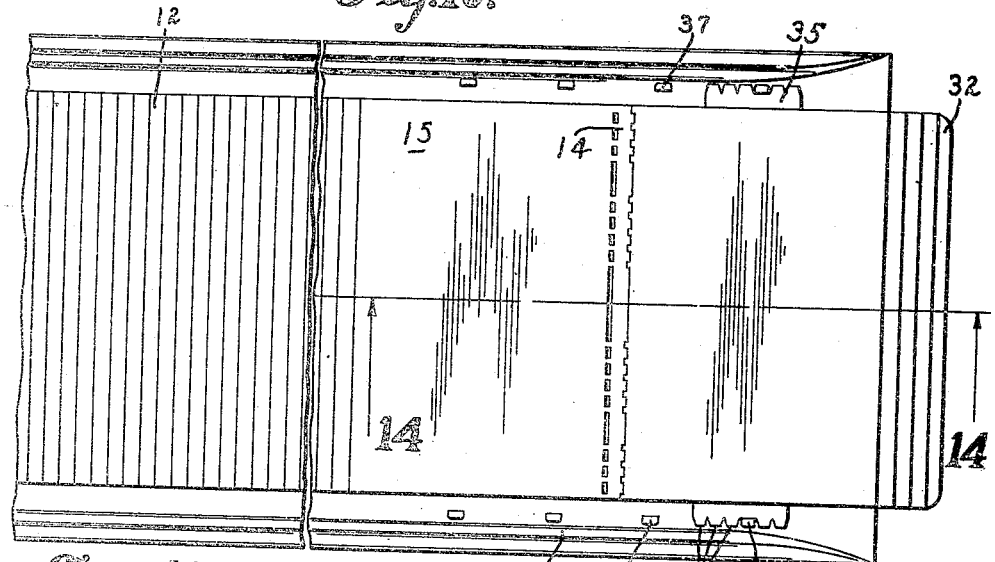
Fig. 10 is a view similar to Fig. 9 of the rear portion of the drawer shown therein, the parts thereof being shown in a different operative position.
Figure 11:
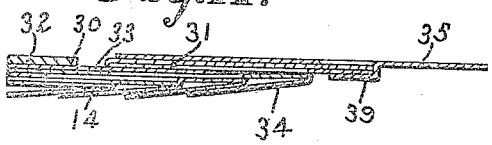
Fig. 11 is a section through the card-like index elements on line 11—11 of Fig. 9, showing the cooperation thereof with certain parts embodying the features of this invention.

In the arrangement shown in Figs. 9 to 14, inclusive, the hinged supporting device 30 comprises a base portion 31, a flap portion 32 and a hinge portion 33, the two former portions 31 and 32 being in this instance made of stiff paper or cardboard and the hinge portion 33 of cloth or similar material, which is secured to each of the former. The base portion as shown in Fig. 11 is a double thickness of material and from the lower thickness a tongue or tongues 34 is struck out, the tongue or tongues 34 being similar in form to the tongues 16 of the element base 14.

A card stop 35 of the type shown in a copending application of William H. Day and Clifford R. Thomas, Serial No. 669,523 and filed October 19, 1923, Patent No. 1,722,563, July 30, 1929 is shown being used in connection with the supporting device 30 in Figs. 9 to 14, inclusive. The card stop comprises a strip of material, preferably metal, having a series of tongues 36 formed at each end thereof which are adapted to detachably engage pocket-like openings 37 disposed along the sides of the drawer 38, and as described in said application is capable of being adjusted longitudinally of the drawer to allow for variations in the number of index elements contained therein.

In this instance, the member 35 locates and supports the supporting device 30 as well as acting as a card stop. The downwardly struck ears 39 of the member 35 engage the base portion 31 of the device 30 and the tongues of said member engage the base portion 14 of the overlying element or card 12 of the series. Being in turn interlocked with the drawer, the member 35, therefore, retains the elements therein and affords a clamping action downwardly upon the said base portions, similar to the action described above regarding the ears 18.

The same remarks as above regarding the use of the device 20, shown in Figs. 1 to 7, inclusive, apply to the device 30, its flap being capable of being swung into the position shown in Figs. 10 and 14 for the same purpose and to obtain the same advantages. The use of the member 35 in combination with the device 30 allows for adjustment of the device 30 longitudinally of the drawer to compensate for variations in the number of elements retained therein.

While I have shown and described a preferred embodiment of my invention, it is to be understood that it is not limited to all of the details shown, nor to the combinations thereof described, but is capable of many modifications and variations which will lie within the spirit of the invention and the scope of the appended claims.

What I claim is:

1. In an index or file, an index element carrying member, a part associated therewith to guide and retain index elements therein, another part associated therewith to prevent accidental removal of said index elements from said guiding means, and an index element support having a portion adapted to be swung into operative position to retain the index elements within said carrying member, said index element support being adapted to detachably engage said second-mentioned part.

2. In an index or file, an index element carrying member having means to guide and retain a plurality of index elements therein, a plurality of index elements slidingly engaged by said means and arranged in overlapped relation with a margin of each extended beyond another upon said carrying member, means adapted to prevent accidental disengagement of said elements from said guiding means, and means detachably connected to said carrying member by said second-mentioned means, said last-named means having a part adapted to swing into a position overlapping said index elements and into another position to be overlapped by said index elements.

3. In an index or file, an index element carrying member having means to retain a plurality of overlapping index elements therein, a plurality of hinged index elements in overlapped relation with a margin of each exposed to view slidingly engaged by said means, a part associated with said carrying member adapted to engage said elements to prevent them from being accidentally slipped from said retaining means and to support them thereon when said carrying member is vertically disposed, and a part detachably secured to said first-mentioned part having a flap portion hinged thereto, said flap portion normally resting upon said index elements and being adapted to swing away from such position to provide a support for said elements when said elements are swung out of their normal overlapped position.

4. In an index or file, an index element carrying member having means to retain a plurality of index elements therein, a plurality of index elements slidingly engaged by said means, a part associated with said carrying member adapted to prevent accidental slippage of said index elements from said retaining means, and an index element support connected to said carrying member by said part, said element support having a portion swingable into one position to retain said elements flatwise upon said carrying member and into another position to support said elements flatwise upon itself.

5. In an index or file, a shallow drawer or the like, an index element retaining strip therein, a plurality of hinged index elements slidingly mounted thereon, an ear at one end of said drawer adapted to engage said index elements to prevent them from sliding from said strip and an element-supporting member detachably engaged by said ear having a portion adapted to swing outwardly over one end of said drawer to support said index elements when the same are swung into a position over and toward the same end of said drawer.

6. In an index or file, a shallow drawer, an index element retaining strip therein, a plurality of hinged index elements slidingly mounted thereon, a holding means at one end of the drawer, a spacer engaged between said holding means and the end index element on said retaining strip and holding it in proper spaced relation from the end of the drawer, and means at the opposite end of the drawer for preventing said index elements from sliding on said strip.

7. In an index or file, a shallow drawer, an index element retaining strip therein, a plurality of hinged index elements slidingly mounted thereon, a holding part on one end of the drawer, a spacer engaging said holding part and the adjacent index element and holding said element spaced from the end of said drawer, said spacer forming a support for said index elements when positioned thereover, means at the opposite end of the drawer for preventing said index elements from sliding on said retaining strip, and a swingable member detachably engaging said last-named means and adapted to be swung over said means to support said elements when the same are swung into a position over said member.

8. In an index device, a carrying member, retaining means mounted thereon, a group of overlapping hinged elements slidably mounted on said retaining means, a supporting member slidably mounted on said retaining means and engaging with said group of elements at one end thereof, a part mounted on said carrying member and engaging said supporting member, a spacer engaging said group of elements at the opposite end thereof, and means on said carrying member for engaging said spacer.

In witness whereof, I have hereunto set my hand this 22 day of July, 1925.

WILLIAM H. DAY.